US012727598B2

(12) United States Patent
Han et al.

(10) Patent No.: US 12,727,598 B2
(45) **Date of Patent: *Sep. 8, 2026**

(54) SURFACTANT COMPOSITION AND USE THEREOF

(71) Applicant: SPECIALTY OPERATIONS FRANCE, Lyons (FR)

(72) Inventors: Zhichao Han, Shanghai (CN); Yuming Zhou, Wuxi (CN); Zixian Chen, Singapore (SG)

(73) Assignee: SPECIALTY OPERATIONS FRANCE, Lyons (FR)

( * ) Notice: Subject to any disclaimer, the term of this patent is extended or adjusted under 35 U.S.C. 154(b) by 974 days.

This patent is subject to a terminal disclaimer.

(21) Appl. No.: 17/273,211

(22) PCT Filed: Sep. 7, 2018

(86) PCT No.: PCT/CN2018/104524

§ 371 (c)(1),
(2) Date: Mar. 3, 2021

(87) PCT Pub. No.: WO2020/047820

PCT Pub. Date: Mar. 12, 2020

(65) Prior Publication Data

US 2021/0195894 A1 Jul. 1, 2021

(51) Int. Cl.
*A01N 25/30* (2006.01)
*A01N 25/14* (2006.01)

(52) U.S. Cl.
CPC ............ *A01N 25/30* (2013.01); *A01N 25/14* (2013.01)

(58) Field of Classification Search
CPC ........ A01N 25/14; A01N 25/30; A01N 37/34; A01N 43/70; A01N 25/12
See application file for complete search history.

(56) References Cited

U.S. PATENT DOCUMENTS 5,152,823 A * 10/1992 Albrecht ................ A01N 57/20 504/144

FOREIGN PATENT DOCUMENTS

| | | | |
|---|---|---|---|
| CN | 102934645 | A | 2/2013 |
| CN | 105188362 | A | 12/2015 |
| CN | 105307999 | A | 2/2016 |
| JP | 2015010045 | A * | 1/2015 |
| WO | 2007059107 | A2 | 5/2007 |
| WO | 2008066611 | A3 | 11/2008 |
| WO | 2011036152 | A2 | 3/2011 |

OTHER PUBLICATIONS

JP 2015-010045 A machine translation (Year: 2015).*

* cited by examiner

*Primary Examiner* — Sue X Liu
*Assistant Examiner* — Nathan W Schlientz
(74) *Attorney, Agent, or Firm* — Osha Bergman Watanabe & Burton LLP

(57) ABSTRACT

A surfactant composition comprising (a) a sulfosuccinate based compound; and (b) a $C_{16}$-$C_{22}$ alkyl sulfate or an alkyl ether sulfate containing $C_{16}$-$C_{22}$ alkyl is provided. A solid agrochemical composition containing said surfactant composition and the use thereof is also provided.

13 Claims, No Drawings

SURFACTANT COMPOSITION AND USE THEREOF

This application is a U.S. national phase entry under 35 U.S.C. § 371 of International Application No. PCT/CN2018/104524, filed on Sep. 7, 2018. The entire content of this application is explicitly incorporated herein by this reference.

TECHNICAL FIELD

The present invention relates to a surfactant composition. The surfactant composition can notably be used as a low foaming wetting agent for solid agrochemical formulations. The surfactant composition comprises a sulfosuccinate based compound, and a $C_{16}$-$C_{22}$ alkyl sulfate or an alkyl ether sulfate containing $C_{16}$-$C_{22}$ alkyl.

BACKGROUND

An agrochemical formulation is generally a homogeneous and stable mixture of active ingredients and inert ingredients which make the final product simpler, safer, and more efficacious to apply to a target pest. Active ingredients used in agrochemical formulations can be prepared and delivered in various forms, such as powders, granules, emulsions and dispersions. Accordingly, the agrochemical formulations may be in the form of sprayable solid, sprayable liquid, sprayable granule, etc.

One type of agrochemical formulations can be in a water dispersible solid form, which may be sprayed for agricultural treatments after dilution. In particular, such formulations include water dispersible granules (WDG), dry flowable (DF) and wettable powders (WP) of a solid active ingredient or a liquid active ingredient loaded onto a solid carrier, which can effect WDG, DF and WP formulations. Some active ingredients that are ultimately soluble in a final dilution useful for spraying may require initial dispersion in water for dissolution to take effect. These particular examples of WDGs may be alternatively described as water soluble granules (WSG).

A further type of agrochemical formulation is a stable suspension of solid active ingredient(s) in a fluid usually intended for dilution with water before use. Such formulations typically include the suspension concentrate (SC) and suspoemulsion (SE) formulation type.

Still a further type of agrochemical formulation is to deliver solid active ingredient(s) on inert or fertilizer carriers. Such formulations are typically prepared as granules to be applied to soils and are referred to as slow dispersing granule (GR) formulations.

In these formulations, the solid active ingredient or the liquid active ingredient loaded on the solid carrier generally requires being dispersed fully back to its primary particle size, or remaining fully dispersed, such that the formulation thereafter maintains a stable dispersion that is suitable for spraying. Also, it is desired that the formulation has good wetting capacities. In order to enhance dispersion and wetting of the formulation, as well as many other benefits, surfactants are usually added into agrochemical formulations for improving the performance.

One problem associated with agrochemical formulations that are based on active ingredients in solid dispersible form or a pre-dispersed form is development of foaming during the dispersion and dilution processes. Foaming may be generated when the formulations are agitated. Such foaming can lead to difficulties in the even spraying of the spray liquid. Further difficulties include a foam-over or spillage of the spray liquid from out of the top of the mixing vessel. In addition, the development of foam may require a farmer to wait a long time for the foam to subside before spraying or may require the addition of defoaming agents which may be expensive, such as those based on silicone oil emulsions.

Surfactants in agrochemical formulations can be the major source of the foaming. For example, alkyl sulfate and alkyl ether sulfate are known as wetting agents for agrochemical formulations. However, alkyl sulfate could cause significant foaming. PCT international patent publication no. 2014/172469 discloses use of alkyl sulfate and alkyl ether sulfate in a foaming agent composition.

Various attempts have been made to provide low foaming WP and WDG agrochemical formulations. It is disclosed that alcohol alkoxylates can be used as low foaming wetting agents. However, the resulting formulations exhibited poor dispersion performance. Fatty acid salts are disclosed to reduce foaming. However, the foam reduction capacity of fatty acid salts is not satisfactory.

There is a need to provide a surfactant composition having wetting capacity which can reduce foaming in dispersion of agrochemical formulations, such as WP and WDG. There is a need to provide a method for reducing or controlling foaming in the dispersion of agrochemical formulations that are based on solid active ingredients. There is a need to provide a solid agrochemical formulation which provides low foaming combined with good wetting capacities.

SUMMARY OF INVENTION

In one aspect, the present invention provides a surfactant composition which comprises:

(a) a sulfosuccinate based compound; and (b) a $C_{16}$-$C_{22}$ alkyl sulfate or an alkyl ether sulfate containing $C_{16}$-$C_{22}$ alkyl.

Said surfactant composition is notably a surfactant composition used for a solid agrochemical composition.

Without wishing to be bound by theory, the surfactant composition of the invention provides a combination of foaming reduction and wetting capacities. It has been surprisingly found that agrochemical formulations incorporating the surfactant composition exhibited reduced foaming when they are dispersed. Foaming of the formulations could be readily measured by standard foaming tests known by a skilled person. Also, the surfactant composition could provide the formulations with excellent wetting capacities.

The term "solid agrochemical composition", as used herein, means an agrochemical formulation which contains a solid agriculturally active ingredient per se, or a solid/liquid agriculturally active ingredient that is formulated into a solid form. The solid agrochemical composition includes water dispersible granule (WDG), dry flowable (DF), wettable powder (WP), suspension concentrate (SC), suspoemulsion (SE), slow dispersing granule (GR), and water soluble granule (WSG) formulations and any other solid dispersible formulation types as may be classified from time to time by the Crop Life International organization. It is appreciated that the solid agrochemical composition includes dispersion and/or dilution of agrochemical formulations that are based on solid active ingredient(s).

In another aspect, the present invention provides a solid agrochemical composition comprising said surfactant composition and an agriculturally active ingredient. Accordingly, the solid agrochemical composition comprises:

(a) an agriculturally active ingredient, notably in solid form; (b) a sulfosuccinate based compound; and (c) a $C_{16}$-$C_{22}$ alkyl sulfate or an alkyl ether sulfate containing $C_{16}$-$C_{22}$ alkyl.

In still another aspect, the present invention provides a method for reducing or controlling the foaming of a solid agrochemical composition, wherein the method comprises the step of adding to the composition a surfactant composition comprising:

(a) a sulfosuccinate based compound; and (b) a $C_{16}$-$C_{22}$ alkyl sulfate or an alkyl ether sulfate containing $C_{16}$-$C_{22}$ alkyl.

DETAILED DESCRIPTION

Throughout the description, including the claims, the term "comprising one" or "comprising a" should be understood as being synonymous with the term "comprising at least one", unless otherwise specified. The terms "between" and "from . . . to . . . " should be understood as being inclusive of the limits.

The articles "a", "an" and "the" are used to refer to one or to more than one (i.e., to at least one) of the grammatical object of the article.

It should be noted that in specifying any range of concentration, weight ratio or amount, any particular upper concentration, weight ratio or amount can be associated with any particular lower concentration, weight ratio or amount, respectively.

As used herein, the term "alkyl" means a saturated hydrocarbon radical, which may be straight, branched or cyclic, such as, methyl, ethyl, n-propyl, iso-propyl, n-butyl, sec-butyl, t-butyl, pentyl, n-hexyl, cyclohexyl.

As used herein, the term "alkenyl" as a group or part of a group denotes an aliphatic hydrocarbon group containing at least one carbon-carbon double bond and which may be straight or branched. The group may contain a plurality of double bonds in the normal chain and the orientation about each is independently E or Z. Exemplary alkenyl groups include, but are not limited to, ethenyl, propenyl, butenyl, pentenyl, hexenyl, heptenyl, octenyl and nonenyl. The group may be a terminal group or a bridging group.

As used herein, the term "hydroxyalkyl" means an alkyl radical, which is substituted with a hydroxyl groups, such as hydroxymethyl, hydroxyethyl, hydroxypropyl, and hydroxydecyl.

As used herein, the terminology "($C_n$-$C_m$)" in reference to an organic group, wherein n and m are each integers, indicates that the group may contain from n carbon atoms to m carbon atoms per group.

As used herein, the term "agriculturally acceptable salts" refers to salts prepared from agriculturally acceptable non-toxic bases or acids including inorganic or organic bases and inorganic or organic acids. Typical agriculturally acceptable salts referred to herein comprise an anion derived from the compound, for example, by deprotonation of a hydroxy or hydroxyalkyl substituent, and one or more positively charged counterions. Suitable positively charged counterions include inorganic cations and organic cations, such as for example, sodium cations, potassium cations, calcium cations, magnesium cations, isopropylamine cations, ammonium cations, and tetraalkylammonium cations.

As used herein, "$C_{16}$-$C_{22}$ alkyl sulfate" refers to an alkyl sulfate which contains $C_{16}$-$C_{22}$ alkyl chain(s) only or an alkyl sulfate which contains substantially $C_{16}$-$C_{22}$ alkyl chains. An alkyl sulfate which contains substantially $C_{16}$-$C_{22}$ alkyl chains means an alkyl sulfate which contains a mixture of $C_{16}$-$C_{22}$ alkyl chain(s) as well as shorter alkyl chain(s), wherein content of the $C_{16}$-$C_{22}$ alkyl chain(s) is at least 90 wt % of the total alkyl chains. As used herein, "$C_1$-$C_{14}$ alkyl sulfate" refers to an alkyl sulfate which contains $C_1$-$C_{14}$ alkyl chain(s) only or an alkyl sulfate which contains substantially $C_1$-$C_{14}$ alkyl chains. An alkyl sulfate which contains substantially $C_1$-$C_{14}$ alkyl chains means an alkyl sulfate which contains a mixture of $C_1$-$C_{14}$ alkyl chain(s) as well as longer alkyl chain(s), wherein content of the $C_1$-$C_{14}$ alkyl chain(s) is at least 90 wt % of the total alkyl chains. It should be understood in the same way when referring to alkyl chain length in alkyl ether sulfates.

The surfactant composition of the present invention comprises (a) a sulfosuccinate based compound; and (b) a $C_{16}$-$C_{22}$ alkyl sulfate or an alkyl ether sulfate containing $C_{16}$-$C_{22}$ alkyl. Preferably, component (b) is a $C_{16}$-$C_{22}$ alkyl sulfate.

The sulfosuccinate based compound include agriculturally acceptable salts of mono-esters of sulfosuccinic acid, agriculturally acceptable salts of di-esters of sulfosuccinic acid, each of which may optionally be alkoxylated, as well as mixtures thereof.

Examples of the sulfosuccinate based compound include and are not limited to:

disodium monooctylsulfosuccinate, disodium lauryl sulfosuccinate, disodium isodecyl sulfosuccinate, disodium tridecyl sulfosuccinate, diammonium lauryl sulfosuccinate, disodium laureth sulfosuccinate, disodium decyl-PEG-4 sulfosuccinate, disodium laureth-5 sulfosuccinate, disodium laurimide (MEA) sulfosuccinate, disodium cocamide MIPA sulfosuccinate, disodium oleamido MIPA sulfosuccinate, disodium oleylamido PEG-2 sulfosuccinate, disodium cocamido MEA sulfosuccinate, diammonium lauramido MEA sulfosuccinate, sodium dioctyl sulfosuccinate, sodium bistridecyl sulfosuccinate, sodium dihexyl sulfosuccinate, sodium dicyclohexyl sulfosuccinate, sodium diamyl sulfosuccinate, sodium diisobutyl sulfosuccinate.

Preferably, the sulfosuccinate based compound is according to the general formula (I):

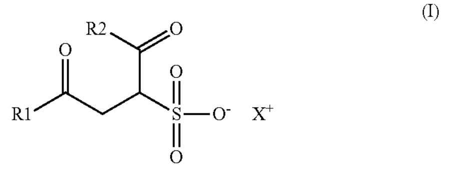

(I)

wherein:

$R_1$ and $R_2$, same or different, is

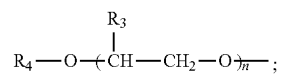

wherein $R_3$ is H, $C_1$-$C_4$ alkyl, alkenyl, hydroxyalkyl or hydroxyalkenyl, such as methyl, ethyl, propyl, isopropyl, butyl, and iso-butyl, preferably $R_3$ is H or methyl;

$R_4$ is $C_1$-$C_{22}$ alkyl, alkenyl, hydroxyalkyl or hydroxyalkenyl, preferably $C_1$-$C_{16}$ alkyl, alkenyl, hydroxyalkyl or hydroxyalkenyl, more preferably $C_4$-$C_{16}$ alkyl, alkenyl, hydroxyalkyl or hydroxyalkenyl, still more preferably $C_8$-$C_{16}$ alkyl or hydroxyalkyl;

n is 0 or an integer of 1 to 100, preferably 0 or an integer of 1 to 50, more preferably 0 or an integer of 1 to 30, in particular, n is an integer of 1 to 30;

$X^+$ is H or a cation, for example, $NH_4$, an alkali metal such as sodium, potassium and calcium, an alkyl substituted ammonium such as ethylamine, propylamine and isopropylamine, and a hydroxyalkyl substituted ammonium such as alkanolamine.

More preferably, the sulfosuccinate based compound is according to the general formula (I)

(I)

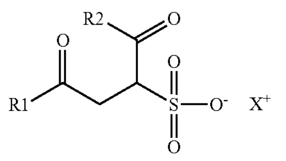

wherein $R_1$ and $R_2$, same or different, is $R_4$—O—, wherein $R_4$ is $C_1$-$C_{22}$ alkyl, alkenyl, hydroxyalkyl or hydroxyalkenyl, preferably $C_1$-$C_{16}$ alkyl, alkenyl, hydroxyalkyl or hydroxyalkenyl, more preferably $C_4$-$C_{16}$ alkyl, alkenyl, hydroxyalkyl or hydroxyalkenyl, still more preferably $C_8$-$C_{16}$ alkyl or hydroxyalkyl;

$X^+$ is H or a cation, for example, $NH_4$, an alkali metal such as sodium, potassium and calcium, an alkyl substituted ammonium such as ethylamine, propylamine and isopropylamine, and a hydroxyalkyl substituted ammonium such as alkanolamine.

Further examples of the sulfosuccinate based compound include Aerosol® series (Solvay), the Agrilan® or Lankropol® series (Akzo Nobel), the Empimin® series (Albright & Wilson), the Cropol® series (Croda), the Lutensit® series (BASF), the Triton® series (Union Carbide), the Geropon® series (Solvay), the Imbirol®, Madeol® or Polirol® series (Cesalpinia).

The $C_{16}$-$C_{22}$ alkyl sulfate suitable for the present invention may be a linear alkyl sulfate or a branched alkyl sulfate. The $C_{16}$-$C_{22}$ alkyl sulfate may be a primary alkyl sulfate or a secondary alkyl sulfate. In the cases of branched alkyl sulfates, the $C_{16}$-$C_{22}$ alkyl sulfate may comprise one, two or more branches. The $C_{16}$-$C_{22}$ alkyl sulfate may be a blend of alkyl sulfates having different alkyl chain lengths and may be a blend of linear and branched alkyl sulfates.

The $C_{16}$-$C_{22}$ alkyl sulfate includes 1. primary alkyl sulfates derived from alcohols made by Oxo reaction on propylene or n-butylene oligomers;
2. primary alkyl sulfates derived from oleic-containing lipids;
3. primary alkyl sulfates, for example the so-called "tridecyl" types derived from oligomerizing propylene with an acid catalyst followed by Oxo reaction;
4. primary alkyl sulfates derived from "Neodol" or "Dobanol" process alcohols: these are Oxo products of linear internal olefins or are Oxo products of linear alpha-olefins. The olefins are derived by ethylene oligomerization to form alpha-olefins which are used directly or are isomerized to internal olefins and metathesized to give internal olefins of differing chain-lengths;
5. primary alkyl sulfates derived from the use of "Neodol" or "Dobanol" type catalysts on internal olefins derived from feedstocks which differ from those normally used to make "Neodol" or "Dobanol" alcohols, the internal olefins being derived from dehydrogenation of paraffins from petroleum;
6. primary alkyl sulfates derived from conventional (e.g., high-pressure, cobalt-catalyzed) Oxo reaction on internal olefins, the internal olefins being derived from dehydrogenation of paraffins from petroleum;
7. primary alkyl sulfates derived from conventional (e.g., high-pressure, cobalt-catalyzed) Oxo reaction on alpha-olefins;
8. primary alkyl sulfates derived from natural linear fatty alcohols such as those commercially available from Procter & Gamble Co.;
9. primary alkyl sulfates derived from Ziegler alcohols such as those commercially available from Albermarle;
10. primary alkyl sulfates derived from reaction of normal alcohols with a Guerbet catalyst (the function of this well-known catalyst is to dehydrogenate two moles of normal alcohol to the corresponding aldehyde, condense them in an aldol condensation, and dehydrate the product which is an alpha, beta-unsaturated aldehyde which is then hydrogenated to the 2-alkyl branched primary alcohol, all in one reaction "pot");
11. primary alkyl sulfates derived from dimerization of isobutylene to form 2,4,4'-trimethyl-1-pentene which on Oxo reaction to the aldehyde, aldol dimerization, dehydration and reduction gives alcohols;
12. secondary alkyl sulfates derived from sulfuric acid addition to alpha- or internal-olefins;
13. primary alkyl sulfates derived from oxidation of paraffins by steps of (a) oxidizing the paraffin to form a fatty carboxylic acid; and (b) reducing the carboxylic acid to the corresponding primary alcohol;
14. secondary alkyl sulfates derived from direct oxidation of paraffins to form secondary alcohols;
15. Primary or secondary alkyl sulfates derived from various plasticizer alcohols, typically by Oxo reaction on an olefin, aldol condensation, dehydration and hydrogenation (examples of suitable Oxo catalysts are the conventional Co, or more recently, Rh catalysts); and
16. primary or Secondary alkyl sulfates other than of linear primary type, for example phytol, farnesol, isolated from natural product sources.

Preferably, the $C_{16}$-$C_{22}$ alkyl sulfate is represented by the general formula (II):

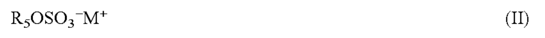

$$R_5OSO_3^-M^+ \quad (II)$$

wherein $R_5$ is a $C_{16}$-$C_{22}$ alkyl or hydroxyalkyl group, either linear or branched, $M^+$ is a cation, such as sodium, potassium, magnesium, ammonium, and organic derivatives thereof, such as monoethanolamine, diethanolamine or triethanolamine. In some preferred embodiments, $M^+$ is sodium or ammonium.

Further examples of the $C_{16}$-$C_{22}$ alkyl sulfate include Lanette® E and Kollliphor® CSS (from BASF).

The alkyl ether sulfate containing $C_{16}$-$C_{22}$ alkyl may be represented by the general formula (III):

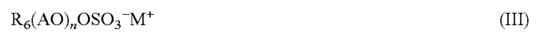

$$R_6(AO)_nOSO_3^-M^+ \quad (III)$$

wherein $R_6$ is a $C_{16}$-$C_{22}$ alkyl or hydroxyalkyl group, either linear or branched;

AO is ethylene oxide (EO), propylene oxide (PO) or mixture thereof, preferably ethylene oxide;

n represents degree of alkoxylation, n may be an integer of 1 to 100, preferably n is an integer of 1 to 30, more preferably 1 to 10;

$M^+$ is a cation, such as sodium, potassium, magnesium, ammonium, and organic derivatives thereof, such as monoethanolamine, diethanolamine or triethanolamine. In some preferred embodiments, $M^+$ is sodium or ammonium.

Examples of the alkyl ether sulfate containing $C_{16}$-$C_{22}$ alkyl include sodium cetostearyl ether sulfate, sodium cetyl ether sulfate, sodium stearyl ether sulfate, such as ALFOTERRA® series from Sasol.

In a preferred embodiment, said surfactant composition further contains a $C_1$-$C_{14}$ alkyl sulfate or an alkyl ether sulfate containing $C_1$-$C_{14}$ alkyl.

According, the present invention also relates to a surfactant composition which comprises (a) a sulfosuccinate based compound; (b) a $C_{16}$-$C_{22}$ alkyl sulfate or an alkyl ether sulfate containing $C_{16}$-$C_{22}$ alkyl; and (c) a $C_1$-$C_{14}$ alkyl sulfate or an alkyl ether sulfate containing $C_1$-$C_{14}$ alkyl. Preferably, component (b) is at least 5 wt % of (b) and (c), such as 5 wt % to 99 wt % of (b) and (c). More preferably, component (b) is at least 8 wt % of (b) and (c), such as 8 wt % to 99 wt % of (b) and (c). Still more preferably, component (b) is at least 10 wt % of (b) and (c), such as 10 wt % to 99 wt % of (b) and (c).

In some embodiments, said $C_{16}$-$C_{22}$ alkyl sulfate or alkyl ether sulfate is branched. In some embodiments, said $C_1$-$C_{14}$ alkyl sulfate or alkyl ether sulfate is branched. In some embodiments, both the $C_{16}$-$C_{22}$ alkyl sulfate or alkyl ether sulfate component and the $C_1$-$C_{14}$ alkyl sulfates or alkyl ether sulfate component are branched.

Examples of branched $C_{16}$-$C_{22}$ alkyl sulfate include sodium heptadecyl sulfate, sodium iso-hexadecyl sulfate. Examples of branched $C_1$-$C_{14}$ alkyl sulfate include sodium isotridecyl sulfate, sodium isodecyl sulphate.

The surfactant composition may be provided as a discrete composition for use in dispersing an active ingredient in solid form, such as formulated into a WDG, SC or WP, or alternatively simply formulated together with the active ingredient.

The surfactant composition preferably contains the sulfosuccinate based compound in an amount of from 1% to 50%, more preferably from 1% to 35%, based on total weight of the surfactant composition.

The surfactant composition preferably contains the $C_{16}$-$C_{22}$ alkyl sulfate or the alkyl ether sulfate containing $C_{16}$-$C_{22}$ alkyl, in an amount of from 1% to 90%. In some embodiments, said amount is from 5% to 35%, based on total weight of the surfactant composition. In some embodiments, said amount is from 70 to 90%, based on total weight of the surfactant composition.

In another aspect of the present invention, there is provided a solid agrochemical composition comprising: (a) an agriculturally active ingredient; (b) a sulfosuccinate based compound; and (c) a $C_{16}$-$C_{22}$ alkyl sulfate or an alkyl ether sulfate containing $C_{16}$-$C_{22}$ alkyl. In particular, there is provided a solid agrochemical composition comprising (a) an agriculturally active ingredient; (b) a sulfosuccinate based compound; (c) a $C_{16}$-$C_{22}$ alkyl sulfate or an alkyl ether sulfate containing $C_{16}$-$C_{22}$ alkyl; and (d) a $C_1$-$C_{14}$ alkyl sulfate or an alkyl ether sulfate containing $C_1$-$C_{14}$ alkyl.

The agriculturally active ingredient is notably an active ingredient in solid form, either the active ingredient per se is solid, or the active ingredient is a solid or liquid which is provided in solid form, for example, loaded on a solid carrier.

The agriculturally active ingredient include any chemical substance that adversely effects the longevity, reproductive capability, and/or growth or metabolic function of plants, insects, fungi, and/or other various phyla. In particular, the agriculturally active ingredient is one or more selected from a herbicide, an insecticide, a fungicide, an acaricide, and a rodenticide.

The agriculturally active ingredient includes without limitation herbicides (e.g., triazines, ureas and sulphonyl ureas), insecticides (e.g., imidacloprid, fipronil and synthetic pyrethroids), fungicides, biocides, molluscicides, algaicides, plant growth regulators, anthelmintics, rodenticides, nematocides, acaricides, amoebicides, protozoacides, crop safeners, adjuvants, or combinations thereof. Without limitation, examples of the agriculturally active ingredients in granulated or powder form in agricultural applications include triazine herbicides such as simazine, atrazine, terbuthylazine, terbutryn, prometryn and ametryn; urea herbicides such as diuron and fluometron; sulphonyl urea herbicides such as chlorsulfuron, metsulfuron methyl, nicosulfuron and triasulfuron; sulphonanilide herbicides such as flumetsulam; organophosphate insecticides such as azinphos methyl, chlorpyrifos, sulprofos and azamethiphos; carbamate insecticides such as aldicarb, bendiocarb, carbaryl and fenobucarb (2-sec-butylphenyl methylcarbamate); synthetic pyrethroids such as bifenthrin; fungicides including chlorothalonil, dimethomorph, benomyl, carbendazim, mancozeb; triazoles such as hexaconazole and diniconazole; and acaricides such as propargite.

In some embodiments, the agriculturally active ingredient is a triazine such as atrazine and simazine. In some embodiments, the agriculturally active ingredient is a triazine, urea, or combination thereof in a WDG or WP formulation. It is appreciated that the compositions may include one or more than one agriculturally active ingredient.

The solid agrochemical composition may comprise the surfactant composition, which contains the sulfosuccinate based compound and the alkyl sulfate/alkyl ether sulfate described herein, in an amount of from 0.1% to 10%, preferably from 0.5% to 5%, based on total weight of the solid agrochemical composition.

The surfactant composition or the agrochemical composition according to the present invention may further comprise other agriculturally suitable ingredients/excipients, such as solvents, pH modifiers, crystallization inhibitors, viscosity modifiers, suspending agents, spray droplet modifiers, pigments, antioxidants, light-blocking agents, compatibilizing agents, antifoam agents/antifoamers, sequestering agents, neutralizing agents, corrosion inhibitors, dyes, odorants, spreading agents, penetration aids, emolients, lubricants, sticking agents, dispersing agents/dispersants, thickening agents, freezing point depressants, antimicrobial agents, and insect repellants.

The surfactant composition or the agrochemical composition may comprise an additional wetting agent. The additional wetting agents are preferably alkylpolysaccharides, alcohol ethoxylates and alkylphenol ethoxylates. Since many of these are in liquid form, they are often provided in a solid form by incorporation into a solid matrix. Non-limiting examples from the alkylpolysaccharide class of wetting agents are alkylpolyglucosides derived from reaction with glucose and a primary hydrocarbon alcohol. Examples of the additional wetting agent that can be used include APG® 325, PLANTAREN® 2000, PLANTARN® 1300, AGRIMUL® PG 2067 (all from Cognis Corporation), ATPLUS® 438 and ATPLUS® 452 (from Uniqema, Inc.). In some embodiments, the surfactant composition or the agrochemical composition further comprises an alkylpolysaccharide as the additional wetting agent, such as an alkylpolyglycoside (APG).

The surfactant composition or the agrochemical composition may further comprise a fatty acid salt. The fatty acid salt suitable for the invention may include any fatty acid suitable for use with an agriculturally active ingredient. In one embodiment, the fatty acid salt is a salt of a $C_8$ to $C_{22}$ fatty acid, which may be saturated or unsaturated (e.g., one of more degrees of unsaturation such as cis and/or trans). Without limitation, examples of saturated fatty acids include $C_{12}$ (lauric acid), $C_{14}$ (myristic acid), $C_{16}$ (palmitic acid), and $C_{18}$ (stearic acid). Without limitation, examples of unsaturated fatty acids include $C_{18}$ (oleic acid and elaidic acid). The fatty acid salts may include any suitable salts. Without limitation, examples of suitable salts include ammonium and alkyl amine salts (e.g. $NH_4^+$, $NHEt_3^+$), alkali metal (e.g. $Li^+$, $Na^+$, $K^+$) and alkaline earth (e.g. $Mg^{2+}$ and $Ca^{2+}$) salts, and trivalent metal salts (e.g. $Al^{3+}$). Without limitation, examples of suitable fatty acid salts include sodium stearate, sodium oleate, aluminum stearate, or combinations thereof.

The surfactant composition or the agrochemical composition may further comprise defoamers. Suitable defoamers include all customary defoamers, preferably silicone-based defoamers, such as silicone oils, for example. Preferred defoamers are those from the group of linear polydimethylsiloxanes having an average dynamic viscosity, measured at 25° C., in the range from 1000 to 8000 mPas, preferably 1200 to 6000 mPas, and containing silica. Silica comprehends forms/modifications such as polysilicic acids, metasilicic acid, ortho-silicic acid, silica gel, silicic acid gels, kieselguhr, precipitated $SiO_2$, etc. Defoamers from the group of linear polydimethylsiloxanes contain as their chemical backbone a compound of the formula $HO—[S_i(CH_3)_2—O—]_n—H$, in which the end groups are modified, by etherification for example, or, in general, are attached to the groups $—S_i(CH_3)_3$. The amount of silica can be modified within a wide range and is generally situated in the range from 0.1 to 10 percent by weight, preferably 0.2 to 5 percent by weight, in particular 0.2% to 2% by weight, of silica, based on the weight of polydimethylsiloxane. Examples of defoamers of this kind are Rhodorsil® Antifoam 416 and Rhodorsil® Antifoam 481 (Solvay). Further defoamers from the silicone group are Rhodorsil® 1824 (Solvay), Antimussol® 4459-2 (Clariant), Defoamer V 4459 (Clariant), SE Visk and AS EM SE 39 (Wacker).

The surfactant composition or the agrochemical composition may further include surfactants as dispersing agents, which include but are not limited to salts of alkylphenol condensates, salts of sulphonated lignins, salts of poly acid resin copolymers, salts of polyphenol formaldehyde resins, salts of polyarylether sulphates such as tristyrylphenolethoxylate sulphate salts, alkoxylated alkylphenols and alcohols as well as block copolymers of ethyleneoxide and propylene oxide. Examples of dispersant that may be used include Geropon® Ultrasperse, Geropon® T/36, Geropon® SC/213, Geropon® TA/72, all from Solvay, Atlox Metasperse 550S (Croda), and Tersperse® 2700 (Huntsman).

The surfactant composition or the agrochemical composition may also include other insoluble materials that may be used in agricultural applications such as fillers and carriers, for example, but not limited to, natural and synthetic silicates and silicate minerals, mineral oxides and hydroxides and also natural and synthetically derived organic materials. Such materials may be added as porous carriers, as moisture inhibition agents, to aid binding or agglomeration properties of a formulation and/or to fill a formulation to a convenient weight. Examples of such fillers may include natural silicates such as diatomaceous earth, synthetic precipitated silicas, clays such as kaolin, attapulgites and bentonites, also zeolites, titanium dioxide, iron oxides and hydroxides, aluminium oxides and hydroxides, amorphous and crystalline silica, diatomite, talc, mica, urea-formaldehyde and polyphenolic resins and calcium carbonate, ammonium sulphate, sodium tripolyphosphate, calcium phosphate, urea and sodium carbonate or organic materials such as bagasse, charcoal, or synthetic organic polymers.

The solid agrochemical composition of the present invention may be WDG, DF, WP, SC, SE, GR, WSG formulations or any other solid dispersible formulation types as may be classified from time to time by the Crop Life International organization. For instance, the solid agrochemical composition may be a suspension concentrate or suspoemulsion formulation type (SC, SE) comprising water.

The solid agrochemical composition is usually dispersed in an aqueous medium before use. Dispersion may be achieved by any suitable methods. For instance, the method may take into account the nature of the composition and compatibility with the components of the composition. In a preferred embodiment, the dispersion of the composition in an aqueous solution is conducted either by hand or with a minimum of mechanical agitation. Mechanical agitation may include stirring, mixing, blending and other suitable processes. The pH of the aqueous dispersion may be from 2.0 to 10.0, preferably from 5.0 to 9.0.

The solid agrochemical composition can be prepared by mixing a combination of components including the surfactant composition described herein, A "combination" of components, may refer to an intimate mixture of components, optionally formulated together as a WDG, DF, WP, SC, SE, GR, or WSG, or merely placement of the respective components together in a dispersing or mixing vessel, or any other degree of admixture in between. Preparing an aqueous dispersion of the solid agrochemical composition refers to providing and dispersing a combination, this can include providing all the components formulated together as a WDG, DF, WP, SC, SE, GR, or WSG, or the active ingredient formulated as a WDG, DF, WP, SC, SE, GR, or WSG, and the surfactant composition or part of the surfactant composition described herein is provided either as separate components or as a "tank-mix" into the dispersing tank or vessel. Where at least one or more of the components are provided separately, they can be optionally first mixed together before dispersion, or alternatively, simply mixed during the dispersion process.

In still another aspect of the invention, there is provided a method for reducing or controlling the foaming of a solid agrochemical composition, comprising the step of adding to the agrochemical composition the surfactant composition described herein. Foaming in dispersions of the agrochemical composition can be reduced by incorporating said surfactant composition in the agrochemical composition.

The solid agrochemical compositions according to the present invention are especially suitable for use in crop protection wherein the compositions are applied to the plants, to parts of the plants or to the area under cultivation, such as to the soils in the area under cultivation.

EXAMPLES

Materials

- Atrazine: 97% purity, from Hebei Shanli Chemical Co., Ltd;
- Chlorothalonil: from Suli Co., Ltd.;
- Simazine: from Zhejiang Zhongshan Chemical Industry Group Co., Ltd.;
- Sulfosuccinate based compound (SS): sodium dioctylsulphosuccinate;
- Alkyl sulfate (AS):
  - AS1: $C_{16}$-$C_{18}$ alkyl sulfate sodium salt, synthesized from natural $C_{16}$-$C_{18}$ alcohol, $C_{16}/C_{18}$=29/71;
  - AS2: $C_{12}$-$C_{14}$ alkyl sulfate sodium salt;
- Alkylpolysaccharide (AP): APG0810 from Yangzhou Chenhua New Material Co., Ltd.;
- Dispersants: Geropon® Ultrasperse from Solvay;
- Water C: CIPAC standard water, 500 ppm hardness;
- Water D: CIPAC standard water, 342 ppm hardness.

Tests in Formulations Prepared by Liquid Mixing Method

The foaming reduction capacity of the inventive surfactant composition was tested by using formulations obtained by mixing the active ingredient, dispersant and wetting agent in water without a granulation process (liquid mixing method). This test enables quick and accurate evaluation of foaming and the results thereof have good consistency with results obtained by the standard foaming test which is developed by the Collaborative International Pesticides Analytical Council (CIPAC) and is described in Method MT 47.2, in which a granulation process is employed.

Firstly, the foaming of formulations that were prepared by the above mentioned liquid mixing method was tested in comparison with foaming of granule formulations which was measured according to the procedure described in CIPAC Method MT 47.2. Results are shown in Table 1 below:

TABLE 1

| | #1 | #2 | #3 | #4 |
|---|---|---|---|---|
| Formulation | | | | |
| Active | Atrazine | | | |
| Dispersant | Geropon ® Ultrasperse | | | |
| Wetting Agent | Rodapon ® LS-94/WP | | Geropon ®L-WET/P | |
| Formulating Method | Granule | Liquid | Granule | Liquid |
| Foaming (mm) | | | | |
| 0" | 82 | 78 | 76 | 62 |
| 1' | 82 | 78 | 16 | 10 |
| 3' | 54 | 78 | 2 | 6 |

Rodapon® LS-94/WP used in the above tests was a wetting agent which by itself caused high foaming while Geropon® L-WET/P was a wetting agent which cased comparatively low foaming. Results showed that the foaming test results of formulations prepared by the liquid mixing method had substantially similar trend with those of formulations prepared by standard granular method, in both high and low foaming formulations. Such results demonstrated that the liquid mixing method can enable accurate evaluation of foaming in agro formulations.

For tests of the foaming, Atrazine formulations were prepared by using the liquid mixing method and according to the recipe as below:

TABLE 2

| Components | Content (wt %; excluding filler) |
|---|---|
| Atrazine (97%) | 92.8% |
| Dispersant | 4.5% |
| Surfactant Composition | 2% |

The formulations were prepared by the following procedures. The Atrazine active ingredient was jet-milled before use, and then blended with the dispersant to form a powder mixture. The powder mixture was then diluted with Water D (CIPAC standard water, 342 ppm hardness) to form a 5 wt % (solid content) Solution A. Solution B was prepared by diluting the surfactant composition with Water D to give a final solid content of 2.5 wt %. Freshly prepared Solutions A and B were mixed in a cylinder for foam assessment. Typically, 19.46 g of Solution A and 0.8 g of Solution B were added in the cylinder, then topped up to 200 ml with Water D. The cylinder was then inverted for 30 times. The cylinder was then hold upright and kept in a water bath of 30° C. Volume of the foams generated in the formulations was measured and recorded at different time points post mixing, i.e. 0 sec, 1 min, and 3 mins.

The various surfactant compositions tested and the foaming test results are shown in Table 3 below:

TABLE 3

| | Surfactant Composition (wt %) | | | | Foam Volume (mm) | | |
|---|---|---|---|---|---|---|---|
| # | SS | AS1 | AS2 | AP | 0" | 1' | 3' |
| EX1 | 10.0 | 90.0 | — | — | 38 | 30 | 30 |
| EX2 | 15.0 | 85.0 | — | — | 40 | 8 | 0 |
| EX3 | 30.0 | 70.0 | — | — | 48 | 16 | 4 |
| EX4 | 50.0 | 50.0 | — | — | 46 | 8 | 2 |
| EX5 | 70.0 | 30.0 | — | — | 52 | 26 | 6 |
| EX6 | 5.0 | 5.0 | 90.0 | — | 56 | 56 | 40 |
| EX7 | 5.0 | 10.0 | 85.0 | — | 80 | 22 | 10 |
| EX8 | 15.0 | 15.0 | 70.0 | — | 72 | 28 | 16 |
| CE1 | — | 100 | — | — | 50 | 50 | 50 |
| CE2 | 100 | — | — | — | 80 | 80 | 80 |
| CE3 | 10 | — | 90 | — | 86 | 86 | 86 |
| CE4 | 15 | — | 85 | — | 88 | 88 | 88 |
| CE5 | 20 | — | 80 | — | 86 | 86 | 86 |
| CE6 | — | — | 100 | — | 78 | 78 | 78 |
| CE7 | 25 | — | 55 | 20 | 72 | 72 | 72 |

("EX" means Example and "CE" means Comparative Example)

Results showed that the inventive surfactant compositions led to markedly reduced foaming compared to other surfactant compositions tested. The reduced foaming was indicated by reduced foaming volume in the formulations post agitation.

Tests in WDG Formulations

In this set of experiments, WDG formulations were prepared and properties of the formulations, including suspensibility, foaming and disintegration, were tested.

WDG granules were prepared according to formulations shown in Table 4 below:

TABLE 4

| | EX9 | EX10 | CE8 | CE9 | EX11 | CE10 | EX12 | CE11 |
|---|---|---|---|---|---|---|---|---|
| | Formulation (wt %) | | | | | | | |
| Atrazine (97%) | 92.8 | 92.8 | 92.8 | 92.8 | — | — | — | — |
| Chlorothalonil | — | — | — | — | 91.5 | 91.5 | — | — |
| Simazine | — | — | — | — | — | — | 92.8 | 92.8 |
| Wetting agent 1 | 2 | 2 | — | — | 2 | — | 2 | — |
| Wetting agent 2 | — | — | 2 | 2 | — | 2 | — | 2 |
| Dispersant | 4.5 | 4.5 | 4.5 | 4.5 | 6 | 6 | 4 | 4 |
| Kaolin | 0.7 | 0.2 | 0.7 | 0.2 | 0.5 | 0.5 | 1.2 | 1.2 |
| EDTA-2Na | — | 0.5 | — | 0.5 | — | 1 | — | — |
| Total | 100 | 100 | 100 | 100 | 100 | 100 | 100 | 100 |

Wetting Agent 1 is the surfactant composition according to Example 4. Wetting Agent 2 is the surfactant composition according to Comparative Example 6.

The granules formulations were made by first milling the solid active ingredient, and then blending with the dispersant and the wetting agent powder in a lab blender. A quantity of water approximately 20% (W/W) was added while the powder was mixed under agitation. The partly wet powder was then extruded through a 1 mm screen on a laboratory scale basket type extruder. The strands extruded were broken to approximately uniform size by shaking and then dried to a residual water content of approximately 0.5% (W/W).

Foaming of the formulations was measured by following the procedure as described above. Foaming at room temperature and 30° C. (1 min post agitation) was measured, respectively.

Suspensibility of the formulations was measured by following the procedure described in CIPAC Method MT15. Generally, the granules (2.5 g) were dissolved in Water C (CIPAC standard water, 500 ppm hardness) at 30° C. and then transferred to a cylinder. The sample was topped up to 250 ml with Water C and the cylinder was sealed. The sample was sufficiently agitated and then put in a water bath of 30° C. for 30 mins. Then, 225 ml of suspension was taken out from the top and the residual 25 ml at the bottom was transferred to a glass plate, dried and weighted. Degree of suspensibility was calculated as: (total weight of the granule−weight of the residue)/total weight of the granule. The total weight of the granule is 2.5 g in this case.

Disintegration was measured by using the following procedure. 100 ml of Water C (30° C. or 10° C.) were added into a cylinder, 1.0 g of the WDG granules was transferred into the cylinder and sealed. Inverted the cylinder with a speed of 2 second/inversion until the granules were fully dispersed. The time for obtaining full dispersion was recorded. Results are shown in Table 5 below:

TABLE 5

| | EX9 | EX10 | CE8 | CE9 | EX11 | CE10 | EX12 | CE11 |
|---|---|---|---|---|---|---|---|---|
| Suspensibility | 98.2% | 98.6% | >99% | 99% | 95% | >99% | 98.1% | 98.2% |
| Foaming (30° C., mm) | 0 | 0 | 76 | 80 | 0 | 70 | 8 | 68 |
| Desintegration (30° C.) | 28" | 28" | 30" | 30" | 30" | 32" | 30" | 36" |
| Desintegration (10° C.) | 52" | 48" | >120" | 60" | 52" | 70" | 56" | >120" |

Results showed that the inventive surfactant composition (e.g. Wetting Agent 1) led to satisfactory suspensibility. In addition, the formulations containing the inventive surfactant composition exhibited reduced foaming compared to those containing short chain alkyl sulfate alone (e.g. Wetting Agent 2). Furthermore, the formulations containing the inventive surfactant composition exhibited shorter disintegration time at low temperature. Such faster disintegration is particularly advantageous for solid agrochemical formulations, especially for use in low temperature environment.

The invention claimed is:

1. A surfactant composition comprising:

(a) a sulfosuccinate based compound; and (b) a $C_{16}$-$C_{18}$ alkyl sulfate;

wherein the $C_{16}$-$C_{18}$alkyl sulfate is according to general formula (II):

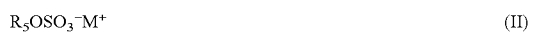

$R_5OSO_3^-M^+$ (II)

wherein $R_5$ is a $C_{16}$-$C_{18}$alkyl or hydroxyalkyl group, either linear or branched, and $M^+$ is a cation.

2. The surfactant composition according to claim 1, wherein the sulfosuccinate based compound is an agriculturally acceptable salt of mono-ester of sulfosuccinic acid, an agriculturally acceptable salt of di-ester of sulfosuccinic acid, each of which is optionally alkoxylated, or a mixture thereof.

3. The surfactant composition according to claim 1, wherein the sulfosuccinate based compound is according to the general formula (I):

(I)

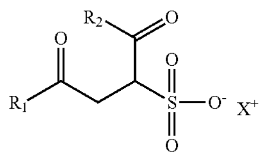

wherein:

$R_1$ and $R_2$, same or different, is

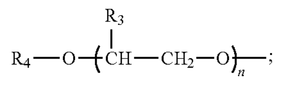

wherein $R_3$ is H, $C_1$-$C_4$ alkyl, $C_1$-$C_4$ alkenyl, $C_1$-$C_4$ hydroxyalkyl or $C_1$-$C_4$ hydroxyalkenyl;

$R_4$ is $C_1$-$C_{22}$ alkyl, $C_1$-$C_{22}$ alkenyl, $C_1$-$C_{22}$ hydroxyalkyl or $C_1$-$C_{22}$ hydroxyalkenyl;

n is 0 or an integer of 1 to 100;

$X^+$ is H or a cation.

4. The surfactant composition according to claim 3, wherein in the general formula (I), $R_1$ and $R_2$, same or different, is $R_4$—O—, $R_4$ is $C_1$-$C_{22}$ alkyl, $C_1$-$C_{22}$ alkenyl, $C_1$-$C_{22}$ hydroxyalkyl or $C_1$-$C_{22}$ hydroxyalkenyl, $X^+$ is H or a cation.

5. The surfactant composition according to claim 1, wherein the surfactant composition further comprises:

(c) a $C_1$-$C_{14}$ alkyl sulfate.

6. The surfactant composition according to claim 5, wherein component (b) is at least 5 wt % of the total weight of components (b) and (c).

7. The surfactant composition according to claim 1, wherein the sulfosuccinate based compound is present in an amount of from 1% to 50%, based on total weight of the surfactant composition.

8. The surfactant composition according to claim 1, wherein the $C_{16}$-$C_{18}$alkyl sulfate is present in an amount of from 1% to 90%, based on total weight of the surfactant composition.

9. A solid agrochemical composition comprising an agriculturally active ingredient and the surfactant composition according to claim 1.

10. The solid agrochemical composition according to claim 9, wherein the agriculturally active ingredient is one or more selected from a herbicide, an insecticide, a fungicide, an acaricide, and a rodenticide.

11. The solid agrochemical composition according to claim 9, wherein the solid agrochemical composition comprises said surfactant composition in an amount of from 0.1% to 10%, based on total weight of the solid agrochemical composition.

12. The solid agrochemical composition according to claim 9, wherein the solid agrochemical composition is a water dispersible granule, dry flowable, wettable powder, suspension concentrate, suspoemulsion, slow dispersing granule or a water soluble granule formulation.

13. A method for reducing the foaming of a solid agrochemical composition, comprising the step of adding to the agrochemical composition (a) a sulfosuccinate based compound; and (b) a $C_{16}$-$C_{18}$alkyl sulfate.

* * * * *